United States Patent
Livingston

(10) Patent No.: US 8,268,174 B2
(45) Date of Patent: Sep. 18, 2012

(54) WASTEWATER TREATMENT METHOD AND SYSTEM WITH OZONATION FOR MICROCONSTITUENT REMOVAL

(75) Inventor: Dennis Livingston, Austin, TX (US)

(73) Assignee: Ovivo Luxembourg S.a.r.l., Munsbach (LU)

( * ) Notice: Subject to any disclaimer, the term of this patent is extended or adjusted under 35 U.S.C. 154(b) by 332 days.

(21) Appl. No.: 12/590,152

(22) Filed: Nov. 2, 2009

(65) Prior Publication Data

US 2011/0100911 A1 May 5, 2011

(51) Int. Cl.
*C02F 3/00* (2006.01)

(52) U.S. Cl. ......... 210/627; 210/150; 210/151; 210/220

(58) Field of Classification Search .......... 210/150–151, 210/627, 220

See application file for complete search history.

(56) References Cited

U.S. PATENT DOCUMENTS

| 5,336,413 | A | 8/1994 | van Staveren et al. | |
| 7,294,278 | B2 * | 11/2007 | Spears et al. | 210/758 |
| 7,867,397 | B2 * | 1/2011 | Lebrun et al. | 210/604 |
| 2002/0190404 | A1 * | 12/2002 | Baarda | 261/115 |
| 2006/0213834 | A1 * | 9/2006 | Kando et al. | 210/636 |
| 2007/0007214 | A1 * | 1/2007 | Zha et al. | 210/718 |
| 2008/0128352 | A1 * | 6/2008 | Fabiyi et al. | 210/627 |

FOREIGN PATENT DOCUMENTS

| FR | 2928366 | 9/2009 |
| WO | WO 2007063198 | 6/2007 |

* cited by examiner

*Primary Examiner* — Chester Barry
(74) *Attorney, Agent, or Firm* — Thomas M. Freiburger

(57) ABSTRACT

In a sewage treatment system, microconstituents, including personal care products and pharmaceutical materials, often difficult to degrade biologically, are removed by supersaturating the untreated wastewater feed with ozone. This breaks down refractory microconstituents into more readily biodegradable materials, subsequently treated preferably in an activated sludge membrane bioreactor process. The oxygen byproduct of ozonation is utilized by feeding the oxygen into an aerobic part of the plant to meet a portion of the biological demand, thereby increasing efficiency of ozone use in the process.

22 Claims, 3 Drawing Sheets

WASTEWATER TREATMENT METHOD AND SYSTEM WITH OZONATION FOR MICROCONSTITUENT REMOVAL

BACKGROUND OF THE INVENTION

The invention is concerned with wastewater treatment and especially efficient removal of refractory biodegradable compounds including so called microconstituents from wastewater in a membrane bioreactor (MBR) process.

A great deal of research has been undertaken to characterize the ability of conventional activated sludge (CAS) and membrane bioreactor (MBR) technologies to remove microconstituents. Microconstituents are dissolved pollutants that are usually measured on the parts per billion (ppb) or parts per trillion (ppt) level. They include personal care products, pharmaceutical materials and hydrocarbons. Microconstituents are often refractory, long-chain organic compounds that are difficult to degrade biologically given typical solids residence times (SRT) (less than 30 days).

In conventional activated sludge processes using sedimentation or membrane filtration for removal of suspended solids, post-disinfection is used to inactivate or kill pathogenic organisms. In addition to disinfection, post treatment including high pressure filtration (e.g. reverse osmosis) is sometimes employed to remove microconstituents.

Submerged MBR (sMBR) technology has a unique advantage over CAS systems using sedimentation for the separation of solids for biologically treated wastewater in that activated sludge concentrations can be more than three times higher allowing for a longer SRT given the same volume. Research suggests that running at longer SRT can lead to better removal of some refractory compounds and specifically some microconstituents. However, results are mixed and studies have not shown a sufficient correlation between treatment efficiency and SRT; therefore, the efficacy of MBR as compared to CAS Systems remains unquantifiable.

Prior art, whether CAS or MBR, often involves the use of high-pressure filtration such as reverse osmosis (RO) followed by post-oxidation (or post disinfection) of permeate using one or more oxidative compounds. The list includes ozone, chlorine and ultraviolet (UV) radiation. High-pressure permeate filtration, in some cases followed by oxidative post-disinfection, has been successful in destroying some microconstituents but is expensive and in many cases impractical. Moreover, the use of chlorine can lead to the formation of undesirable disinfection byproducts, some of them known carcinogens.

SUMMARY OF THE INVENTION

In a system and process of the invention, pretreated (screened, degritted) wastewater is saturated with ozone or contacted with a second stream of ozonated permeate for partial treatment or conditioning of refractory biodegradable compounds including microconstituents. The degraded ozone forms oxygen which is then used to offset biological process requirements.

The byproducts of wastewater ozonation are smaller, more readily biodegradable compounds and oxygen. The oxygen produced during ozonation is used to meet a portion of the total biological demand for aerobic processes in the system and in some cases may evolve as bubbles, partially offsetting the need for air scouring of submerged membrane separators.

Ozonating wastewater breaks down non- or less-biodegradable compounds including microconstituents into more readily biodegradable compounds that can be subsequently treated in an activated sludge MBR process at a shorter SRT. Given a target mixed liquor suspended solids (MLSS) concentration a shorter SRT translates into a reduced tank volume, allowing for what is called process intensification (reducing plan area and tank volume requirements to achieve a given treatment objective). For example, ozone can break down benzene rings into smaller carbon molecules readily consumed by microorganisms reducing the SRT required for treatment from 30 days to less than 5 days.

In one embodiment of the invention, pretreated (fine screened, degritted, etc.) wastewater (influent) is essentially saturated with ozone to concentrations ranging between 25 mg/l and 100 mg/l before being fed directly into an MBR. Given the dilute concentrations of carbon substrate in municipal wastewater, it is possible to safely aerosolize influent and contact with ozone for saturation but the range is limited to protect against auto-ignition (typically less than 80 psig depending on loading). In another embodiment, treated permeate with virtually non-detectable amount of carbon materials is essentially saturated and the ozonated stream contacted with pressurized influent. This method of contacting influent with ozone requires water to be filtered twice but allows for higher concentrations of ozone to be safely achieved, increasing viability of the invention.

As explained above, the ozonated wastewater will contain a greater portion of more readily biodegradable oxygen demand (rBOD) and be oxygen-rich, making it more treatable and improving process efficiency in three ways by reducing: (1) the volume of the tank by more than 20%; (2) the supplemental oxygen requirement by 20%-40% and; (3) the amount of air required for scouring membrane separators by 5%-10% depending on the residual oxygen concentration (above 10 mg/l gas evolution will occur). The total amount of oxygen required for any biological process is a function of the pollutant loading and other site conditions. The invention uses the oxygen byproduct of ozonation to meet some or all of the demand set by the process. Additional oxygen will ordinarily be necessary to meet the total biological demand, but not in all cases.

It is among the objects of the invention to improve the space efficiency and process efficiency of MBRs in removing microconstituents by contacting wastewater with ozone as a form of partial treatment or conditioning, thus breaking down refractory compounds into readily biodegradable materials, utilizing the oxygen byproduct of ozonation to supplement process oxygen, and in many cases offsetting membrane air scouring through gas evolution. These and other objects, advantages and features of the invention will be apparent from the following description of a preferred embodiment, considered along with the accompanying drawings.

DESCRIPTION OF PREFERRED EMBODIMENTS

Figure 1:
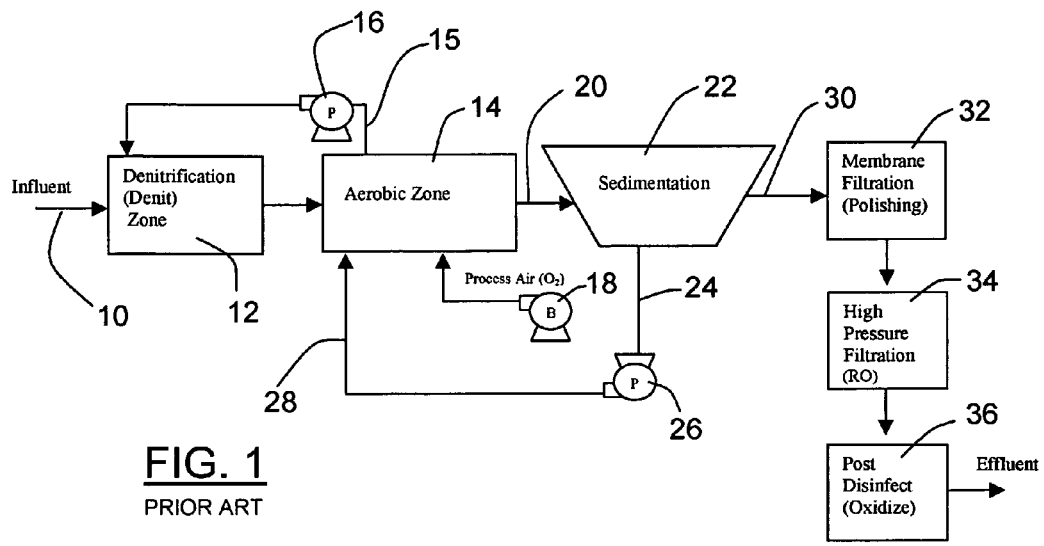
FIGS. 1 and 2 are flow charts showing prior art liquid side wastewater treatment, with sedimentation or membrane filtration and with conventional post-treatment oxidation.
Figure 2:
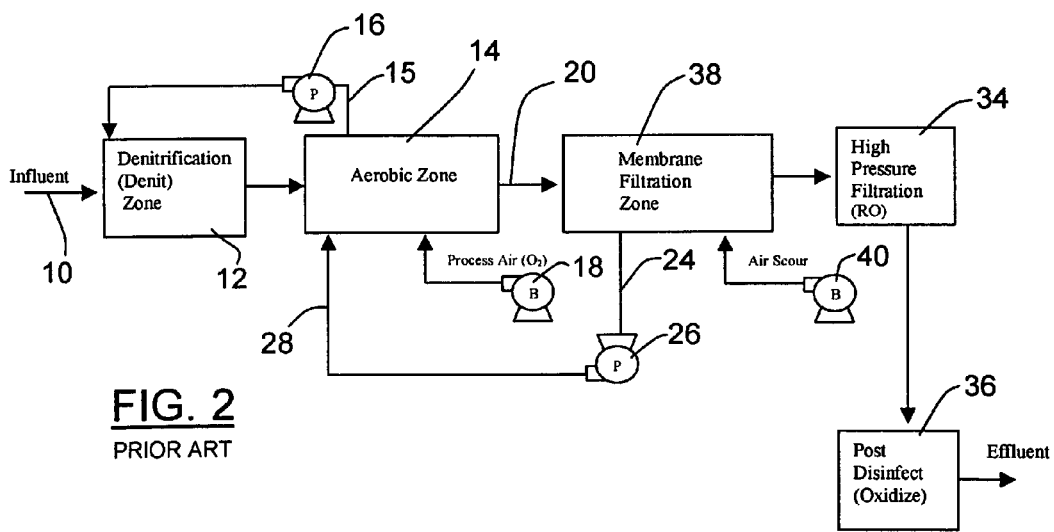

FIGS. 1 and 2 show systems used in the prior art. In the system of FIG. 1 influent 10 enters the denitrification zone 12, from which it passes to an aerobic zone 14. Recycle back to the denitrification zone is shown at 15, via a pump 16. Process air is shown introduced to the aerobic zone by a blower 18. As indicated, mixed liquor exiting the aerobic zone at 20 is introduced to a sedimentation tank 22, from which settled sludge is withdrawn at 24 and delivered via a pump 26 to be recycled into the aerobic zone 14, as shown at 28.

In the conventional system of FIG. 1, supernatant 30 from the sedimentation tank 22 goes to a membrane filtration zone 32, where further solids are removed, and the permeate liquid may then be put through high pressure filtration in a reverse osmosis (RO) treatment 34. The resulting liquid may be put through an oxidative post-disinfection treatment, indicated at 36 (this treatment could involve chlorination or other disinfectant or oxidative treatments). The membrane separation 32 can be for removing total suspended solids (TSS), turbidity, and pathogens. The RO treatment 34 can be for further removal of solids measured as silt density index (SDI), microconstituents, ionic species and pathogens. Post disinfection at 36 is generally for sterilizing or killing remaining pathogens (e.g. viruses) but can also be used to destroy microconstituents. These processes are expensive.

FIG. 2 shows a prior art system very similar to that of FIG. 1, with the exception that a membrane filtration zone 38 replaces the sedimentation tank 22. Air scour is shown introduced to the membrane zone 38 by a blower 40, for cleaning the membranes and also to supply process air in the zone 38. This zone 38 also replaces the membrane filtration shown at 32 in FIG. 1, and again, the permeate from membrane filtration can be put through reverse osmosis or high pressure filtration at 34, and a post-disinfection treatment at 36, the zones 34 and 36 being for the purpose of removal or destruction of pathogens, microconstituents and other components as noted above that have been present in the influent.

Figure 3:
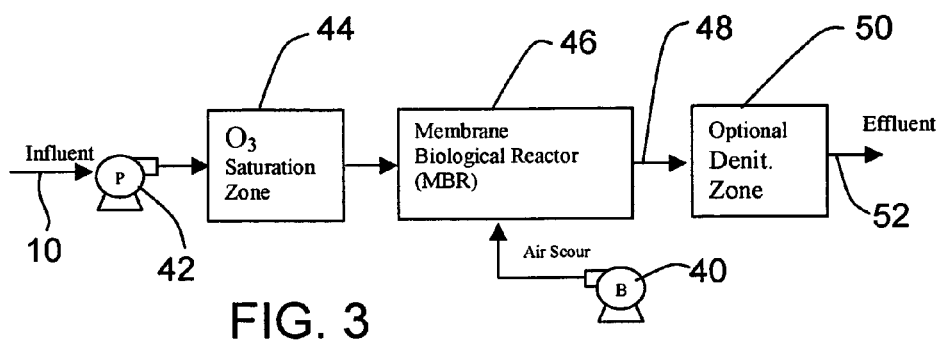
FIG. 3 is a flow chart indicating one embodiment of the invention where ozonated influent is fed directly into an MBR for full biological treatment and solids separation (filtration).

FIG. 3 shows one embodiment of the invention. Here, influent 10, which has been fine-screened or degritted in a pretreatment step, is shown as put under pressure by a pump 42, so that it is delivered under pressure into the ozone saturation zone 44. Pressure can be, for example, about 25 to 80 psig, or somewhat higher. The influent is aerosolized in the presence of gaseous ozone and saturated according to Henry's Law, to achieve saturation concentrations greater than 25 mg/l. However, the solids in the wastewater are combustible, so that aerosol pressure must be controlled to keep the aerosol at a safe level to prevent auto-ignition.

In the system of FIG. 3 the ozonated, saturated or essentially saturated influent passes into a membrane biological reactor or MBR, shown at 46. From the point of saturation 44, dissolved ozone rapidly reacts with carbonaceous materials including refractory organic compounds such as microconstituents. Depending on the hydraulic residence time (HRT) between saturation and discharge into the membrane biological reactor 46, some or all of the ozone may be converted into oxygen. A blower 40 is shown introducing air for air scour in the MBR 46. The ozonated, ozone rich influent entering the MBR is depressurized; the MBR zone is not under pressure. As a result, a small envelope or area around the point of discharge is temporarily supersaturated and conversion of remaining ozone to oxygen is rapid in the presence of mixed liquor (ML). Some of the oxygen byproduct may evolve as bubbles in the MBR or all of the oxygen can diffuse into the bulk solution. This helps supply process oxygen to the ML in the MBR. In addition, the ozone introduced in the zone 44 breaks down microconstituents or refractory materials as explained above, resulting in smaller, more readily biodegradable compounds as well as the released oxygen. The oxygen bubbles evolving in the MBR 46 can contribute to air scouring of the membrane separators, and the point of introduction of the ozonated influent in the MBR tank 46 can be arranged so that the evolving bubbles add to the air scour bubbles from the blower 40 for scouring membranes.

As indicated in FIG. 3, permeate at 48 can be directed to an optional denitrification zone 50, where a final denitrification step includes running the permeate through filters or other equipment for removal of nitrates. Denitrified permeate effluent from the zone 50 is shown at 52.

By use of the ozonation, particularly at saturation or near-saturation and under pressure, this produces a greater proportion of more readily biodegradable oxygen demand and results in reduction of tank volume, reduction of supplemental oxygen requirements and usually reduction in scour air requirements, depending on the residual oxygen concentration and the evolution of bubbles in the zone 46. With enough process oxygen supplied to the MBR and with sufficient inventory of biological solids in the MBR, a separate aerobic zone is not necessary. By not putting the influent directly into an anoxic zone, as conventionally done, the system of the invention can take advantage of the oxygen created by ozonation. Although the system theoretically gives up the efficiency of using nitrates of a recycle stream (e.g. the stream 15 in FIG. 1) to meet oxygen demand in an initial anoxic zone, the ozonation makes up for this through breakdown of refractories and reduction of supplemental oxygen requirements.

Figure 4:
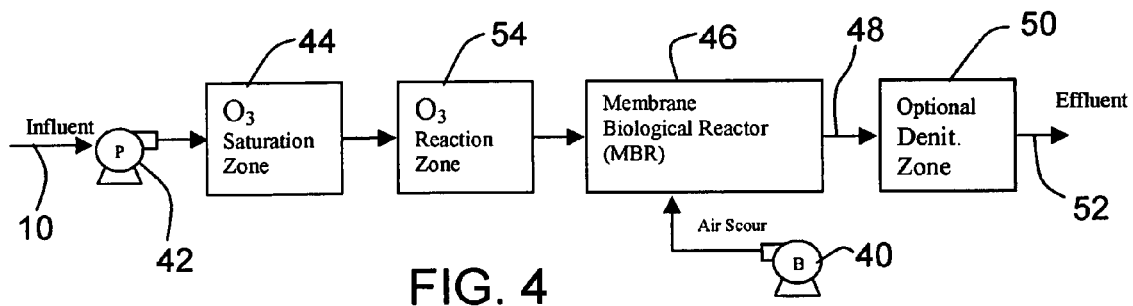
FIG. 4 is a flow chart indicating a second embodiment of the invention wherein ozonated influent is allowed to fully react before being fed into an MBR for full biological treatment and solids separation (filtration).

FIG. 4 shows a variation of the system of FIG. 3. In this modified embodiment the ozonated influent is allowed to fully react before being fed into an MBR 46 for full biological treatment and solids separation by filtration. The treatment of influent 10 is similar to the system of FIG. 3, except that on leaving the ozonation zone 44 the ozonated influent is allowed to more fully react in a pressurized ozone reaction zone 54. This permits the ozone to be kept in solution, preferably at near saturation under the pressurized conditions, for a longer period of time so that breakdown of microconstituents can be more thorough. The remaining steps and zones are similar to those of the FIG. 3 system.

Figure 5:
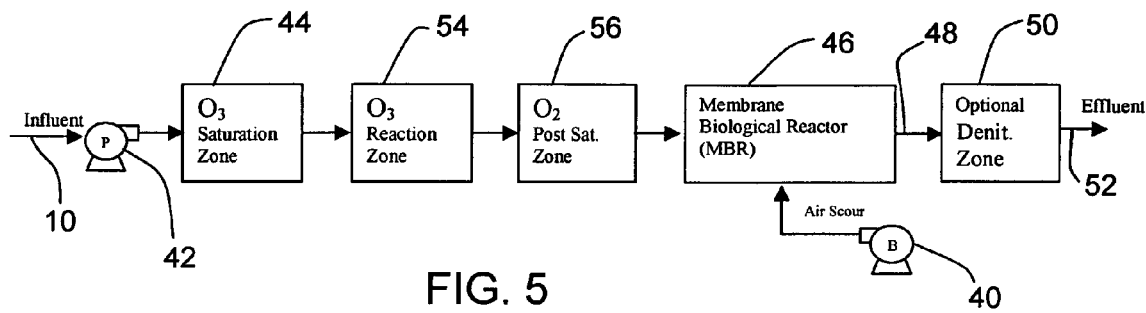
FIG. 5 is a flow chart indicating a third embodiment of the invention wherein a ozonated, reacted influent is saturated with oxygen to meet all or most of the process oxygen requirements.

FIG. 5 shows a third embodiment of the invention, a variation of the FIG. 4 system. This system adds to FIG. 4 an oxygen post-saturation zone 56 downstream of the ozone reaction zone 54. The ozonated, reactive influent from the zones 44 and 54 is then saturated or essentially saturated with oxygen, preferably still under pressure, to provide sufficient oxygen to meet essentially all of the process oxygen requirements. Pressure may be in a range of about 80 to 110 psig, to produce an oxygen concentration of at least about 250 mg/l, and preferably about 300 mg/l. Again, the biological reactions occur in the MBR 46, in which the influent is depressurized. Oxygen may evolve as useful scouring bubbles, reducing blower 40 requirements and providing process oxygen; soluble oxygen may also diffuse from a zone of supersaturation around the point of discharge and into the bulk solution at less than or equal to standard conditions from both the reacted ozone remaining in solution and the oxygen introduced in the zone 56.

Figure 6:
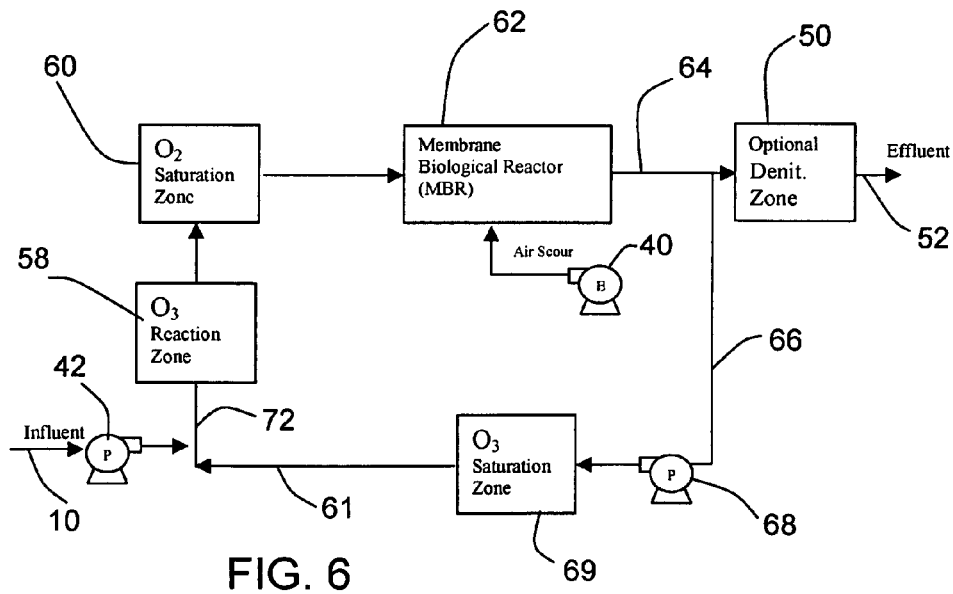
FIG. 6 is a flow chart indicating a fourth embodiment of the invention wherein a slip stream of permeate is ozonated and then contacted with influent.

FIG. 6 is another flow chart showing a further modification of the systems described above. In this form of system, influent at 10 is again pressurized via a pump shown at 42 and enters an ozone reaction zone 58 followed by an oxygen saturation zone 60, both under pressure. The ozone in the stream comes from a pressurized permeate stream, a recycle stream 61 with ozonation, as described below. The influent stream, blended with permeate, is saturated or essentially saturated with oxygen at the pressure in the zone, which may be in the range of about 80 to 200 psig, and the influent at this point has ozone. The influent with dissolved oxygen is then delivered to an MBR 62, where the liquid is depressurized and oxygen diffuses into the bulk solution, offgases forming scouring bubbles, or both, depending on conditions. Again, any bubbles formed can be used to supplement air scour via a blower 40, lowering air scour requirements in most cases. Oxygen concentration can be maintained greater than about 8 mg/l to increase aerobic respiration rates and reduce necessary residence times. The permeate 64 from the MBR is then primarily directed to an optional denitrification zone 50, if included in the system, and denitrified permeate effluent exits the system at 52 (or discharged as effluent without denitrification). Alternatively, the MBR zone 62 (as with the MBR zones in FIGS. 3-5) can be maintained at a low residual oxygen concentration, less than about 2 mg/l, to induce simultaneous nitrification and denitrification, removing nitrates and ordinarily avoiding the need for zone 50.

However, a portion of the permeate 64 from the MBR is directed, as shown at 66, through a pressurizing pump 68 and to an ozone saturation zone 69, under pressure, as the permeate stream 61 described above. Thus the permeate at 61, which may comprise about 25 percent or more of the permeate at 64, is saturated or essentially saturated with ozone at the pressure under which it is maintained (range of approximately 20 psi to 100 psi). This pressurized, ozonated stream enters the influent stream downstream of the influent pump 42, producing at 72 an ozone-laden influent mix which has combined the essentially ozone-saturated permeate at 61 with the raw and pressurized influent. This is the pressurized influent to the ozone reaction zone 58 and then to the oxygen saturation zone 60, producing a heavily oxygen and ozone-laden influent on depressurized entry into the MBR 62. Oxygen bubbles evolve in the MBR from both the oxygen and ozone contained in the influent, providing for essentially all process oxygen requirements in the zone 62 and potentially reducing air scour requirements by the blower 40. As discussed above, this system safely ozonates the permeate water, which can be by high-pressure aerosol methods, rather than directly ozonating the influent as in the systems of FIGS. 3 and 4.

In a variation of the system as described, oxygen alone can be saturated into the incoming wastewater. Such a system could be as in FIG. 3 or 4, but with oxygen saturation and reaction zones rather than ozone saturation and reaction zones. Oxygen pressures can be higher, such as a range of about 110 to 300 psig, and can produce an oxygen concentration greater than about 300 mg/l.

All references to pressure in p.s.i. refer to gauge pressure (psig, above atmospheric). References to supersaturation are relative to saturation levels at standard temperature and pressure.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A biological wastewater treatment system requiring process oxygen, comprising:
   ozonation means for introducing ozone into an influent stream of wastewater under pressure, for breaking down refractory biodegradable compounds including microconstituents and for meeting a substantial part of biological demand for process oxygen, and
   an MBR zone downstream of the ozonation means for receiving the partially treated, oxygen rich wastewater for full biological treatment and solids separation through filtration.

2. The system of claim 1, wherein the ozonation means includes means for pressurizing the wastewater to between 20 and 80 psig and exposing the wastewater to gaseous ozone under pressure for saturation, and wherein the MBR zone has submerged membrane separators removing permeate from mixed liquor, with the pressurized influent introduced beneath the membrane separators, allowing a portion of oxygen formed as a byproduct of ozonation to offgas, reducing air scouring requirements at residual concentrations above approximately 10 mg/l (atmospheric conditions), and allowing pressure energy to increase efficiency of air scour by increasing rise velocity of air and liquid between membrane separators.

3. The system of claim 2, wherein saturation of ozone is between about 50 mg/l and 80 mg/l ozone.

4. The system of claim 2, further including an ozone reaction zone as a separate enclosure downstream of the ozonation means, the ozone reaction zone being under pressure to that of the ozonation means, and being of sufficient volume to provide 20 to 120 minutes of holdup time allowing for full conversion of ozone to oxygen before being fed into the MBR zone for treatment.

5. The system of claim 4, further including oxygen saturation means between the ozone reaction zone and the MBR zone for saturating the ozonated, reacted wastewater with oxygen under at least the same pressure.

6. The system of claim 5, wherein pressure in the oxygen saturation means is in a range between about 80 and 110 psig, producing an oxygen concentration of at least about 250 mg/l.

7. The system of claim 1, further including oxygen saturation means between the ozonation means and the MBR zone for saturating the ozonated, reacted wastewater with oxygen under at least the same pressure.

8. The system of claim 7, wherein pressure in the oxygen saturation means is in a range between about 80 and 110 psig, producing an oxygen concentration of at least about 250 mg/l.

9. The system of claim 1, wherein the ozonation means comprises a recycled slip stream of ozonated permeate, comingled into the influent wastewater, the permeate discharged from the MBR zone as a recycle stream and substantially saturated with ozone under pressure.

10. The system of claim 9, wherein the recycled slip stream of permeate is saturated to concentration greater than 20 mg/l ozone.

11. The system of claim 9, wherein the permeate is saturated to concentrations over 80 mg/l at pressure of about 50 to 200 psig.

12. The system of claim 1, wherein the ozonation means comprises ozone saturation means for directly contacting the influent wastewater with ozone under pressure to essentially saturate the wastewater with ozone.

13. A biological wastewater treatment process requiring process oxygen, comprising:
- introducing ozone into an incoming stream of wastewater under pressure and breaking down refractory biodegradable compounds including microconstituents,
- directing the ozonated wastewater downstream to an MBR zone at which pressure is released, such that oxygen is produced from the ozone and meets a substantial part of the biological demand for process oxygen in the MBR zone, and
- treating the wastewater in the MBR zone to break down nutrients while extracting permeate.

14. The process of claim 13, further including maintaining simultaneous nitrification and denitrification in the MBR zone, thus removing nitrates.

15. The process of claim 13, wherein the wastewater is pressurized to between 25 and 80 psig and exposed to gaseous ozone under pressure for saturation, then fed directly into the MBR zone, which has submerged membrane separators removing permeate from mixed liquor in the MBR zone.

16. The process of claim 13, further including maintaining a low residual oxygen concentration in the MBR zone, less than about 2.0 mg/l, for the purpose of inducing simultaneous nitrification and denitrification, thus removing nitrates.

17. The process of claim 13, further including maintaining a residual oxygen concentration in the MBR zone greater than about 8.0 mg/l, thus increasing aerobic respiration rates and reducing necessary residence times.

18. The process of claim 13, wherein oxygen produced as a byproduct of ozonation offgases in the MBR zone, reducing air scouring requirements at residual concentrations above approximately 10 mg/l.

19. The process of claim 13, wherein the ozonated wastewater is saturated with oxygen under at least the same pressure as the ozonation process, then directed to the MBR zone.

20. The process of claim 19, wherein the oxygen is saturated into the ozonated wastewater at pressure in a range between about 110 and 300 psig, producing an oxygen concentration greater than about 300 mg/l.

21. The process of claim 13, wherein the step of introducing ozone under pressure comprises recycling a slip stream of permeate from the MBR zone, and co-mingling the ozonated permeate slip stream into the influent wastewater.

22. The process of claim 21, wherein the permeate is saturated to concentrations over 80 mg/l at pressure of about 50 to 100 psig.

* * * * *